Dec. 24, 1963  P. R. BLACKMAN ETAL  3,115,568
ELECTRIC ARC CUTTING
Filed Sept. 25, 1961
FIG. 3
FIG. 2
FIG. 1
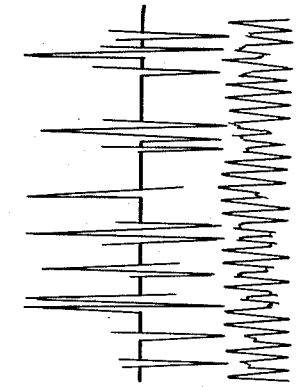
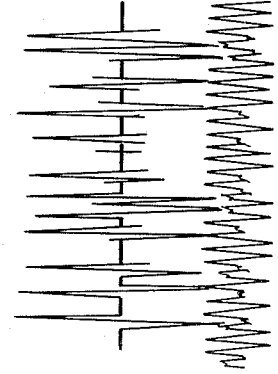
*INVENTORS*
PAUL R. BLACKMAN
CRAIG R. SIBLEY
BY
*Leslie C. Byer*
ATTORNEY

United States Patent Office 3,115,568
Patented Dec. 24, 1963

3,115,568
ELECTRIC ARC CUTTING
Paul R. Blackman, Cranford, and Craig R. Sibley, New Providence, N.J., assignors to Air Reduction Company, Incorporated, New York, N.Y., a corporation of New York
Filed Sept. 25, 1961, Ser. No. 140,440
15 Claims. (Cl. 219—69)

Our invention relates to metal cutting with an electric arc established between the forward side of a bare consumable electrode and the apex of the kerf formed in the workpiece by metal melted therefrom.

It has heretofore been proposed to cut metals with a high current density self-regulating arc maintained between the forward side of a bare consumable electrode and the apex of the kerf formed in the workpiece by feeding the electrode into the kerf at a substantially constant speed sufficiently high to maintain its arcing terminal portion within the kerf to at least substantially the full depth thereof. In this procedure, cutting action proceeds without actual physical contact between the electrode and the workpiece and the current never falls to zero. This procedure of electric arc cutting is described in the Welding Handbook, fourth edition, section three (published in 1959) at pages 51.16 to 51.28 inclusive. This procedure is characterized by the high speed of cutting which for half inch aluminum plate varies from about 40 to 190 inches per minute and which for half inch stainless steel plate varies from about 30 to 70 inches per minute. The procedure is preferably conducted in a shielding atmosphere of argon containing 1% by volume of oxygen when cutting aluminum and in a shielding atmosphere of 80% argon and 20% oxygen when cutting stainless steel. A bare mild steel wire $\frac{3}{32}$ inch in diameter is a satisfactory electrode for cutting sections up to 1 inch in thickness although the current demand for heavier sections may require electrode wires of greater diameter. The procedure is usually performed with direct current at reverse polarity but it is also possible to use straight polarity direct current or alternating current if certain activating agents are applied to the electrode wire as has been disclosed in United States Patent 2,867,713, Albert Muller, January 6, 1956. When using alternating current an inductive transformer having a constant current characteristic is employed. If an activating agent is not applied to the electrode wire, it is necessary to use superimposed high frequencies or a keep-alive arc circuit so that the cutting arc is readily reestablished each time its current value goes through zero.

In this known method of arc cutting the current demand is established by the travel or cutting speed and is substantially independent of electrode feed speed unless this rate is inadequate to maintain arcing within the kerf formed in the workpiece. Furthermore, the minimum kerf width and smoothest cut is obtained when the voltage of the source of cutting current is just above that root-mean-square value at which the arc can be maintained without short circuiting. Higher voltages produce an unstable arc and deep gouges in the cut surfaces especially when cutting in an argon atmosphere which is preferred for aluminum in order to prevent oxidation of the cut surfaces. Square cuts are produced if the electrode feed speed is sufficient to keep a solid end portion thereof extending through the kerf formed in the workpiece. Consequently, as the cutting speed is reduced, the current is reduced and the voltage required to produce this current may be reduced until a threshold value of voltage is ultimately attained beyond which it is not possible to maintain the arc and the electrode contacts the workpiece and produces a short circuit which interrupts the cutting action. With these low voltages for low currents and cutting speeds the arc is not generally reestablished when short circuiting occurs even though a constant potential source or a rising voltage characteristic source is employed for supplying the cutting current.

As noted above, the speed of cutting with this known method is high, being usually greater than that speed at which shape cutting machines can be operated when using conventional forms of tracing devices. These tracing devices will follow the contour of a template or drawing at a travel speed of from 6 to 30 inches per minute which is considerably less than the cutting speed of the high current density self-regulating arc method of cutting just described. These tracing devices have, however, proved suitable for conventional cutting machines using an oxyacetylene cutting torch and it is desirable to have a form of arc cutting which can be substituted economically for the oxyacetylene torch of such shape cutting machines. The tracing device of these machines may be manually guided by the operator along the outline of a drawing or the edge of a template or it may be guided automatically by either mechanical or electrical means. In an automatic mechanical tracing device an operative element of the device engages and follows a guide strip or makes a magnetic engagement with the edge of a template and in an automatic electrical tracing device a photocell control is usually employed for following the outline of a drawing. It is also possible to employ punched or magnetic tape controls in which intelligence previously committed to a tape causes the tracing device to produce a cut of predetermined contour.

It is an object of our invention to provide a method of electric arc cutting with a consumable electrode at current levels and a wide range of cutting speeds which adapt it for use in conventional shape cutting machines of the type above described.

It is also an object of our invention to provide a method of electric arc cutting with a consumable electrode in which a cutting action at low speed is obtained by an intermittent arcing action between the electrode and the workpiece while maintaining this action within the kerf formed in the workpiece.

It is a further object of our invention to provide a process of arc cutting which is independent of ambient atmospheres which may be inert or oxidizing in character.

It is another object of our invention to provide a process of electric arc cutting in which the current demand is relatively low and can be supplied by durable and low cost sources.

Other objects of our invention will become apparent from a consideration of the following description thereof.

In accordance with our invention intermittent arcing is produced between a bare consumable electrode and a workpiece by current surges supplied thereto from an alternating source of constant root-mean-square voltage whose value at the desired cutting speed is sufficient to sustain only momentarily an arcing condition across the gaps formed between the electrode and the workpiece by metal progressively melted and expelled therefrom by such current surges and the arc force produced thereby. Furthermore, this voltage value is also insufficient to restrike an arc across the gaps formed in the workpiece after the alternating cutting current goes through its zero value. Consequently the electrode periodically makes contacts with the workpiece to secure during half cycle periods of the alternating current source, short circuiting and arcing at a high repetition rate. Also in accordance with our invention the electrode is fed to the workpiece at a speed which will maintain this intermittent arcing and short circuiting within the kerf formed in the workpiece. To produce the intermittent arcing actions of current may be supplied from a constant potential alternating current transformer which has its output circuit directly connected across the electrode and the workpiece and its input circuit directly connected to a suitable source of constant alternating voltage such as the harmonic sixty cycle values readily obtained from distribution circuits universally used for lighting and power purposes. The current surges resulting from our method of arc cutting are predominantly of half cycle duration and have a substantial uniform pattern of occurrence which increases with the cutting speed. These half cycle surges of current have crest values of the order of 1,000 amperes or more but as previously stated the output voltage of the constant potential transformer is insufficient at the predetermined cutting speed to sustain the arc formed across the gaps produced in the workpiece by metal melted therefrom by these current surges or to restrike the arc across said gaps after the alternating cutting current passes through its zero value. The cut formed in the workpiece by our method of arc cutting is not dependent on the nature of the gas supplied about the electrode and the workpiece at the location of cutting. In fact, when cutting stainless steel jets of air or oxygen may be supplied to the cut in order to assist in discharging therefrom any dross that may be formed during arcing. In practicing our invention it is quite necessary to maintain the inductance of the circuit through which cutting current is supplied at the low values characteristic of those found in constant potential alternating current transformers of conventional design.

The three figures of the accompanying drawing respectively show profiles of cuts made in one-half inch aluminum plates with an electrode of rimmed steel when practicing our invention. In each profile view there is an associated oscillogram showing the voltage and current variations that occurred during the cutting action obtained by intermittent arcing between the electrode and the workpiece produced by sixty cycle alternating current supplied to the electrode and workpiece from a constant potential transformer. In each case the applied voltage was about 30 (root-mean-square value), the cutting speed was 13 inches per minute and a shielding gas was supplied about the arcing terminal of the electrode and the adjacent workpiece at 35 standard cubic feet per hour.

In FIG. 1 the cutting operation was performed in an ambient atmosphere of argon containing 1% oxygen.

In FIG. 2 the cutting action was performed in an ambient atmosphere of carbon dioxide.

In FIG. 3 the cutting action was performed in an ambient atmosphere of air.

Except for the substitutions of a constant potential transformer of proper output voltage for supplying the alternating cutting current which we employ, the apparatus shown in United States Patent 2,867,713, Albert Muller, January 6, 1959, or British Patent 731,953, may be employed. Best use of our invention will be obtained, however, when the cutting head of these patents forms part of a shape-cutting machine controlled by a conventional tracer mechanism so that the arc cutting speed is within the range where accurate patterns can be cut using the tracing or motion devices commonly employed for oxyacetylene cutting.

By referring to the oscillograms shown in the drawing it will be noted that the cutting action is secured by rapidly recurring surges of current and that the value of the applied voltage producing these surges of current is sufficient only for momentarily maintaining an arc between the electrode and the workpiece. These surges of current are obtained by intermittent arcing and short circuiting between the electrode and the workpiece which occur at a high repetition rate due to the incremental removal of molten metal from the workpiece by the rapidly recurring current surges which occur during half cycle periods of the current supply whose voltage value for the predetermined cutting speed will only momentarily sustain and not restrike an arc across the gaps progressively formed in the workpiece by metal melted and expelled therefrom by these current surges. During the cutting action the bare metal electrode employed is fed to the workpiece at a rate such that an arcing portion thereof is maintained within the kerf formed in the workpiece by the metal progressively melted therefrom by the current surges. It will be noted by referring to the oscillograms shown in each of the figures that the arc is out or extinguished about 72% of the time in FIGS. 1 and 2 and about 62% of the time in FIG. 3.

The cutting action may be started with the electrode in feeding motion and then traversing it relative to the workpiece to bring its forward side into contact with the edge of the workpiece. Pierce starts and running pierce starts may also be made. Pierce starting requires that the cutting head be over the workpiece before electrode feed begins. As the electrode feeds, it hits the top rather than the edge of the workpiece and pierces a hole through it. In conventional piercing, the traversing mechanism is not started until the hole is pierced. In a running pierce start the traversing mechanism is in motion before electrode feed is initiated.

As shown in the figures of the drawing the quality of the cut is substantially independent of the ambient atmosphere in which it is produced. The cut shown in FIG. 1 which was produced in an argon atmosphere has a rougher profile than that shown in the two other views where oxidizing atmospheres were employed. This is believed to be due to the fact that for a given applied voltage longer arcs can be drawn in the argon atmosphere since the voltage gradient of the arc column therein is less than that which is obtained in an oxidizing atmosphere such as carbon dioxide or air.

Cutting in accordance with our invention may be characterized as a nibbling action in which increments of metals are progressively removed from the workpiece by the rapidly recurring current surges employed. This is in contrast to the cutting action resulting when using a maintained arc as disclosed in the method of cutting described in the above referred to section of the Welding Handbook. When using this known method of cutting with a maintained arc, ultra-slow motion pictures show that the arc oscillates along the vertical axis of the end of the electrode extending into or through the cut at a frequency which increases with the cutting speed. At a cutting speed of 70 inches per minute, the rate of oscillation with a maintained arc is about 200 cycles per second when cutting stainless steel one-half inch in thickness. There is approximately three oscillations of the arc plasma for each of the drag lines formed on the cut surface. This ratio could be caused by an arc oscillation occurring once on the forward wall and once on each side wall of the kerf removing metal by a shaving action analogous to that mechanically obtained with a milling cutter.

With our procedure the cutting mechanism is entirely different. Since the arc is out a great percentage of the time, ultra-slow motion pictures cannot be used to demonstrate this different cutting mechanism but the oscillograms shown in the figures of the drawing clearly indicate that the arc is extinguished frequently. While the arc is energized, it melts away a portion of the workpiece and by the expulsion of the molten metal from the workpiece lengthens to a point where it can no longer be sustained by the applied voltage of the alternating current and the arc goes out rapidly because there is insufficient inductance in circuit with the arc to sustain it. As the electrode is traversed across the workpiece to produce the cut, additional short circuiting and arcing occur and more increments of the workpiece are melted and expelled from the cut. As the cutting speed is reduced, the arc-out time is lengthened because it takes longer for the electrode to contact fresh metal and conversely as the cutting speed increases, the arc-out time diminishes.

When using a rimmed steel electrode with a flowing stream or jet of gas for cutting in accordance with our invention at least three factors are involved in the removal of molten metal from the kerf to produce either quality or severance cuts. In addition to the inherent arc forces, the gaseous activity caused by the release of oxygen from the rimmed electrode wire helps to expel molten metal and promotes oxidation of the dross. Severance cuts can be made with killed or deoxidized electrode wire, but a tenacious dross may remain attached to the cut pieces. Finally, dross is expelled mechanically by the stream of gas passing through the kerf.

In order to produce square cuts when practicing our invention the electrode must be fed at a sufficient speed to keep its solid tip portion at the bottom of or beyond the kerf produced in the workpiece. For quality cuts it has been found desirable to have the tip of the electrode extend beyond the lower surface of the workpiece being cut. If this is not done, conditions may produce a severance cut but with a collection of dross along the lower edge of the discard side of the cut.

When practicing our invention operating conditions have been determined for cutting speeds within the range of 10 to 30 inches per minute of which the following are considered exemplary. For a quality cut in half inch aluminum plates at 20 inches per minute the applied voltage was 28, the approximate amperage was 940, and the electrode feed speed was 348 inches per minute. To produce this quality dross-free cut the electrode at times extended beyond the lower surface of the plate by about 8 inches. A severance cut with continuous attached dross in such aluminum plate could be produced at 20 inches per minute when using this same applied voltage, an approximate amperage of 790 and an electrode feed speed of 182 inches per minute. When cutting half inch stainless steel plate at 20 inches per minute, the voltage was 26, the approximate amperage was 1300 and the electrode feed speed was 585 inches per minute. In each case the voltages and currents are root-mean-square values. Regardless of the material being cut, the electrode employed was 3/32 inch in diameter and formed of a relatively inexpensive bare rimmed steel wire which as described above produces a quality dross-free cut. For cutting shapes comprising reverse curves a cylindrical electrode or its near equivalent must be used. For straight line cutting electrodes having a rectangular section could be used in practicing our invention if for some reason it was desirable to produce the cut at the low speeds obtainable with our method.

For thinner metals the applied voltage and current employed are less than in the examples given above and for thicker materials these values are greater. The range of voltage employed in cutting aluminum plates of from 1/8 inch to 3/4 inch in thickness varied from 22 to 30 with the current increasing, of course, with the increases in voltage employed. These voltages are slightly above the voltages employed when cutting with the above referred to maintained arc when this voltage is just above that required to maintain the arc without short circuiting.

Direct current sources of supply are not commercially suitable for producing the rapidly recurring current surges which are characteristic of the intermittent arcing action which we employ. If the direct current supply is obtained from a constant potential selenium cell rectifier set, the surges of voltage that occur each time the arc is extinguished are sufficient to puncture and finally destroy the selenium cells. This is, of course, also true of other forms of contact rectifier sets. In the case of dynamoelectric generators, the transformer action occurring between the series and shunt fields thereof produces destructive voltages in the shunt field circuits which will damage the field winding or the rheostat connected in circuit with the shunt field winding. Furthermore, the inherent inductance of the load circuit of such machines is usually not low enough to secure our desired cutting action. When using a constant potential alternating current transformer in accordance with our invention these voltage surges have no adverse effect on the transformer or its windings. Also, when using alternating current the current passes through zero every half cycle of the source of the supply and the arc is consequently readily extinguished unless, of course, the electrode again makes contact with the workpiece so that consecutive half cycles of current flow occur. In practicing our invention, however, as is shown in the oscillograms of the figures of the drawing the current flow is only momentarily sustained and is predominantly of half cycle duration.

Attempts were made with both alternating current and direct current sources of supply to improve the cutting efficiency and decrease the prominence of the drag lines formed in the profiles of the cut surface by keeping the arc alive for longer periods of time by introducing inductance in the supply circuit. The use of such inductance reduced the current peaks and increased the arc on time, producing arc instability and cuts of poor quality. With highly inductive circuits it was difficult or impossible to reinitiate arcing following short circuiting because sufficiently high current surges could not be obtained. In practicing our invention the current surges must rise and fall rapidly in order to secure the desired results. This is only accomplished by using low inductive sources. The current surges must be frequent, uniform, and of short duration.

It is, of course, apparent that our invention is not limited to the use of 60 cycle sources of alternating current supply since sources of different frequencies may be employed to produce the steep current surges which are productive of the intermittent arcing characteristic of our invention. Furthermore, the current surges we employ need not be supplied through a transformer circuit if a constant voltage of the required value is obtainable through a circuit having the desired low inductance. The constant potential transformer is just a convenient means of reducing commercially available constant voltages to those values used in practicing our invention.

Thus, while we have described our invention with regard to particular embodiments thereof, modifications and adaptations thereof will readily occur to those skilled in the art. It is consequently our intention to cover all changes and modifications of our invention herein described which do not constitute departures from the spirit and scope thereof.

What we claim as new and desire to secure by Letters Patent is:

1. The method of cutting metals which comprises traversing a bare consumable electrode and a workpiece at a predetermined cutting speed relatively to one another along a desired line of section in said workpiece, producing rapidly recurring current surges productive of intermittent arcing between said electrode and said workpiece by directly connecting said electrode and said workpiece in circuit with a source of alternating current of constant voltage whose value is capable only of momentarily sustaining an arc across the gaps formed between said electrode and said workpiece by metal progressively melted and expelled therefrom by said current surges and which consequently produces between said electrode and said workpiece at said predetermined cutting speed frequent short circuits and periods when the arc is extinguished, and feeding said electrode towards said workpiece at a rate such that an arcing portion of said electrode is maintained within the kerf formed in said workpiece by the metal progressively melted from said workpiece by said current surges.

2. The method of cutting metals which comprises traversing a consumable electrode and a workpiece relatively to one another at a predetermined cutting speed along a desired line of section in said workpiece, removing increments of metal from said workpiece by rapidly recurring surges of current produced by intermittent arcing contacts between said electrode and said workpiece by current supplied directly thereto from a source of alternating constant voltage whose value for said predetermined cutting speed will only momentarily sustain an arc across the gaps formed between said electrode and said workpiece by the expulsion therefrom of metal rendered molten by said surges of current, and feeding said electrode to said workpiece at a rate such that an arcing portion of said electrode is maintained within the kerf formed in said workpiece by the metal progressively melted from said workpiece by said surges of current.

3. The method of cutting metals which comprises traversing a consumable electrode and a workpiece relatively to one another at a predetermined cutting speed along a desired line of section in said workpiece, removing increments of metal from said workpiece by rapidly recurring surges of current produced by intermittent arcing contacts between said electrode and said workpiece by current supplied directly thereto from a source of alternating constant voltage whose value for said predetermined cutting speed will only momentarily sustain an arc across the gaps formed between said electrode and said workpiece by the expulsion therefrom of metal rendered molten by said surges of current, feeding said electrode to said workpiece at a rate such that an arcing portion of said electrode is maintained within the kerf formed in said workpiece by the metal progressively melted from said workpiece by said surges of current, and supplying about the arcing portion of said electrode a flowing stream of oxidizing gas.

4. The method of cutting metals which comprises traversing a consumable electrode and a workpiece relatively to one another at a predetermined cutting speed along a desired line of section in said workpiece, removing increments of metal from said workpiece by rapidly recurring surges of current produced by intermittent arcing contacts between said electrode and said workpiece by current supplied directly thereto from a source of alternating constant voltage whose value for said predetermined cutting speed will only momentarily sustain an arc across the gaps formed between said electrode and said workpiece by the expulsion therefrom of metal rendered molten by said surges of current, feeding said electrode to said workpiece at a rate such that an arcing portion of said electrode is maintained within the kerf formed in said workpiece by the metal progressively melted from said workpiece by said surges of current, and supplying about the arcing portions of said electrode a flowing stream of argon containing by volume one percent of oxygen.

5. The method of cutting metals which comprises traversing a cylindrical consumable electrode and a workpiece at a predetermined cutting speed relatively to one another along a desired line of section in said workpiece, producing between said electrode and said workpiece an arcing condition during which intermittent arcing and short circuiting between said electrode and said workpiece occurs at a high repetition rate due to incremental removal of molten metal from the workpiece by rapidly recurring current surges of 1,000 amperes or more occurring during half cycle periods of current flow from an alternating current source of constant voltage whose value for said predetermined cutting speed will only momentarily sustain an arc across the gaps progressively formed in the workpiece by the metal melted therefrom by said current surges, and feeding said electrode to said workpiece at a rate such that an arcing portion of said electrode is maintained within the kerf formed in said workpiece by the metal progressively melted from said workpiece by said surges of current.

6. The method of cutting metals which comprises traversing relatively to one another a bare consumable electrode and a workpiece which are connected across a source of alternating current supplied thereto through a constant potential transformer circuit of low inductance and having a constant output voltage adequate only to produce an intermittent arcing condition between said electrode and said workpiece as said electrode and said workpiece are traversed relative to one another at a speed productive of rapidly recurring short circuits and current surges between said electrode and said workpiece, and feeding said electrode to said workpiece at a rate such that an arcing portion of said electrode is maintained within the kerf formed in said workpiece by the metal progressively melted from said workpiece by said current surges.

7. The method of cutting metals which comprises traversing a consumable electrode and a workpiece at a predetermined cutting speed relatively to one another along a desired line of section in said workpiece, producing a rapidly recurring series of short circuits and intermittent arcing between said electrode and said workpiece with sixty cycle alternating current supplied thereto from a constant potential source of supply directly connected thereto through a constant potential transformer having for said predetermined cutting speed an output voltage which is less than that required for sustaining an arc across the gaps progressively formed in said workpiece by metal melted therefrom by current surges which are initiated by said short circuits, are predominantly of half cycle duration and have a substantially uniform pattern of occurrence which increases with said cutting speed, and feeding said electrode to said workpiece at a rate such that an arcing portion of said electrode is maintained within the kerf formed in said workpiece by the metal progressively melted from said workpiece by said current surges.

8. The method of cutting metals which comprises traversing a consumable electrode and a workpiece at a predetermined cutting speed relatively to one another along a desired line of section in said workpiece, connecting said electrode and said workpiece in circuit with a substantial constant voltage sixty cycle alternating current source of supply through a constant potential transformer having its primary winding directly connected to said source of alternating current and having its secondary winding directly connected across said electrode and said workpiece to produce by contact and arcing between said electrode and said workpiece at said predetermined cutting speed surges of current which are predominantly of half cycle duration and which occur at substantially regularly spaced intervals, the output voltage of said transformer for said predetermined cutting speed between said electrode and said workpiece being less than that required for sustaining an arc across the gaps formed in said workpiece by metal melted therefrom by said current surges initiated by short circuits between said electrode and said workpiece, and feeding said electrode to said workpiece at a rate such that an arcing portion of said electrode is maintained within the kerf formed in said workpiece by the metal progressively melted from said workpiece by said current surges.

9. The method of cutting metals which comprises traversing a consumable electrode and a workpiece at a predetermined cutting speed relatively to one another along a desired line of section in said workpiece, connecting said electrode and said workpiece in circuit with a substantial constant voltage sixty cycle alternating current source of supply through a constant potential transformer having its primary winding directly connected to said source of alternating current and having its secondary winding directly connected across said electrode and said workpiece to produce by contact and arcing between said electrode and said workpiece at said predetermined cutting speed surges of current which are predominantly of half cycle duration and which occur at substantially regularly spaced intervals, the output voltage of said transformer for said predetermined cutting speed between said electrode and said workpiece being less than that required for sustaining an arc across the gaps formed in said workpiece by metal melted therefrom by said current surges, feeding said electrode to said workpiece at a rate such that an arcing portion of said electrode is maintained within the kerf formed in said workpiece by the metal progressively melted from said workpiece by said current surges, and supplying about the arcing portion of said electrode a flowing stream of oxidizing gas.

10. The method of cutting metals which comprises traversing a bare consumable cylindrical electrode of rimmed steel and a workpiece at a predetermined cutting speed relatively to one another along a desired line of section in said workpiece, connecting said electrode and said workpiece in circuit with a substantially constant voltage sixty cycle alternating current source of supply through a constant potential transformer having its primary winding directly connected to said source of alternating current and having its secondary winding directly connected across said electrode and said workpiece to produce by contact and arcing between said electrode and said workpiece at said predetermined cutting speed surges of current which are predominantly of half cycle duration and which occur at substantially regularly spaced intervals, the output voltage of said transformer for said predetermined cutting speed between said electrode and said workpiece being less than that required for sustaining an arc across the gaps formed in said workpiece by metal melted therefrom by said current surges, feeding said electrode to said workpiece at a rate such that an arcing portion of said electrode is maintained within the kerf formed in said workpiece by the metal progressively melted from said workpiece by said current surges, and supplying about the arcing portion of said electrode a flowing stream of oxidizing gas.

11. The method of cutting metals which comprises traversing a consumable electrode and a workpiece at a predetermined cutting speed relatively to one another along a desired line of section in said workpiece, connecting said electrode and said workpiece in circuit with a substantial constant voltage sixty cycle alternating current source of supply through a constant potential transformer having its primary winding directly connected to said source of alternating current and having its secondary winding directly connected across said electrode and said workpiece to produce by contact and arcing between said electrode and said workpiece at said predetermined cutting speed surges of current which are predominantly of half cycle duration and which occur at substantially regularly spaced intervals, the output voltage of said transformer for said predetermined cutting speed between said electrode and said workpiece being less than that required for sustaining an arc across the gaps formed in said workpiece by metal melted therefrom by said current surges, feeding said electrode to said workpiece at a rate such that an arcing portion of said electrode is maintained within the kerf formed in said workpiece by the metal progressively melted from said workpiece by said current surges, and supplying about the arcing portion of said electrode a flowing stream of argon containing by volume one percent of oxygen.

12. The method of arc cutting which comprises producing intermittent arcing between a consumable electrode and a workpiece by current surges supplied thereto from an alternating current source of constant voltage whose value at the desired cutting speed is sufficient to sustain only momentarily an arc across the gaps formed between said electrode and said workpiece by metal progressively melted and expelled therefrom by said current surges so that said electrode periodically makes contacts with said workpiece to produce during half cycle periods of said alternating current source short circuiting and arcing at a high repetition rate, and feeding said electrode to said workpiece at a rate to maintain said arcing within the kerf formed by the discharge from said workpiece of molten metal produced by said current surges.

13. The method of arc cutting which comprises producing intermittent arcing between a consumable electrode of rimmed steel and a workpiece by current surges supplied thereto from an alternating current source of constant voltage whose value at the desired cutting speed is sufficient to sustain only momentarily an arc across the gaps formed between said electrode and said workpiece by metal progressively melted and expelled therefrom by said current surges so that said electrode periodically makes contacts with said workpiece to produce during half cycle periods of said alternating current source short circuiting and arcing at a high repetition rate, and feeding said electrode to said workpiece at a rate to maintain said arcing within the kerf formed by the discharge from said workpiece of molten metal produced by said current surges.

14. The method of arc cutting which comprises producing intermittent arcing between a consumable electrode of rimmed steel and a workpiece by current surges supplied thereto from an alternating current source of constant voltage whose value at the desired cutting speed is sufficient to sustain only momentarily an arc across the gaps formed between said electrode and said workpiece by metal progressively melted and expelled therefrom by said current surges so that said electrode periodically makes contacts with said workpiece to produce during half cycle periods of said alternating current source short circuiting and arcing at a high repetition rate, feeding said electrode to said workpiece at a rate to maintain said arcing within the kerf formed by the discharge from said workpiece of molten metal produced by said current surges, and supplying about the arcing portion of said electrode and through the kerf in the workpiece a flowing stream of oxidizing gas.

15. In electric arc cutting wherein arcing is secured between a consumable electrode and a workpiece, the method of reducing the cutting speed which comprises producing rapidly recurring short circuits productive of intermittent arcing between the electrode and the workpiece by supplying sixty cycle alternating current thereto from a constant potential transformer having its output terminals directly connected across said electrode and said workpiece and having an output voltage within the range of 20 to 30 volts, the voltage increasing with increases in the magnitude of the cutting current employed for workpieces of increasing thickness, and feeding said electrode to said workpiece at a rate to maintain said arcing within the kerf formed by the discharge from said workpiece of molten metal produced by said short circuits and arcing.

References Cited in the file of this patent

UNITED STATES PATENTS

| | | |
|---|---|---|
| 2,867,713 | Muller | Jan. 6, 1959 |
| 2,886,696 | Tuthill et al. | May 12, 1959 |

FOREIGN PATENTS

| | | |
|---|---|---|
| 731,953 | Great Britain | June 15, 1955 |

OTHER REFERENCES

"Welding Journal," September 1956, pp. 915–919.